May 5, 1936. F. VON VOIGTLANDER 2,039,694
DIAPHRAGM HORN
Filed March 16, 1936
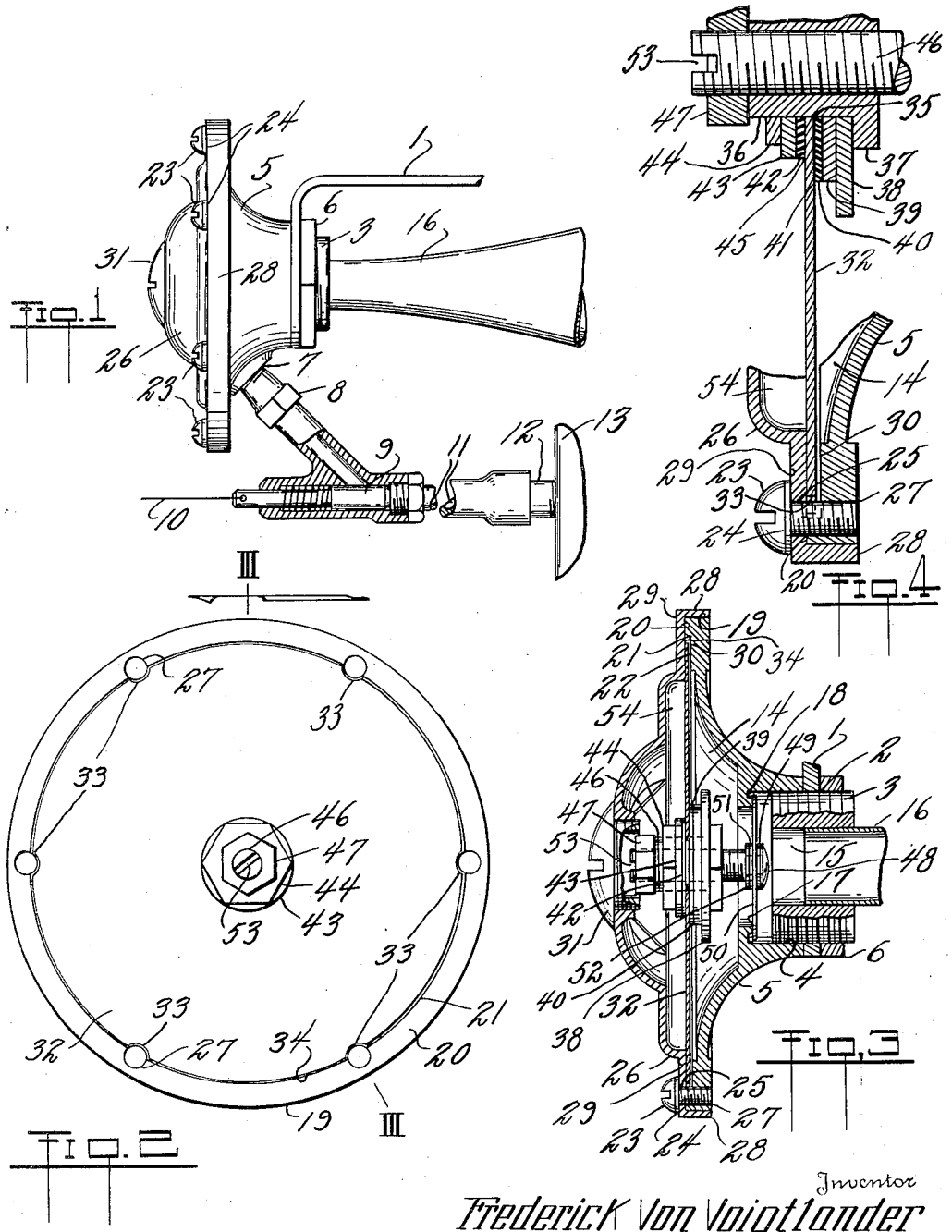
Inventor
Frederick Von Voigtlander
Attorney Patented May 5, 1936

2,039,694

UNITED STATES PATENT OFFICE 2,039,694

DIAPHRAGM HORN

Frederick Von Voigtlander, Adrian, Mich., assignor to Schwarze Electric Company, Adrian, Mich., a corporation of Michigan Application March 16, 1936, Serial No. 69,165

8 Claims. (Cl. 116—142)

This invention relates to horns of the diaphragm type.

This invention has utility when incorporated in mountings for horn diaphragms, more especially as adapted independently of centering thereof.

Referring to the drawing:

Fig. 1 is a fragmentary side view of an embodiment of the invention adapted to a sound signal or horn, say in motor vehicle use;

Fig. 2 is a side view of the diaphragm for the horn of Fig. 1 on the side away from the projector;

Fig. 3 is a section on the line III—III Fig. 2; and

Fig. 4 is a fragmentary detail on an enlarged scale, showing features of the mounting seat and diaphragm for the horn.

Bracket 1 is shown having eye 2 through which extends externally threaded bushing 3 engaging internally threaded portion 4 of casing member 5. Nut 6 on this threaded bushing 3 positions the bracket 1 for holding the device in the desired assembly position in a motor vehicle. This casing member 5 has port 7 at which is located fitting 8 having therein plunger 9 operable by control 10, say from the dash of the motor vehicle. This control 10, as opened, permits communication by duct 11 having fitting assembly 12, with intake 13 to the internal combustion motor of this motor vehicle. It thus follows that manual operation of the control 10 affects communication as by suction, reduced pressure or vacuum from the intake 13 to the interior chamber portion 14 of the casing member 15.

The bushing 3 has central opening 15 in which is press fitted projector 16 desirably additionally anchored by soldering, brazing or welding. Between this projector 16 and the chamber 14, the casing member 5 has annular seat 17, spaced by clearance 18 from the root of the internally threaded portion 4. The seat 17 is of ring form and toward the projector 16 from the chamber 14. The casing member 5 is provided with outward annular seat 19, and therefrom inwardly extending annular seat 20 separated by ledge 21 as a seat concentric to the seat 19. From this ledge 21, parallel to the seat 20 and concentric thereof is seat 22. Bolts 23 through yieldable washers 24 and openings 25 in companion or complementary casing member 26 assemble this member 26 with the casing member 5 as these bolts 23 enter threaded openings 27 in the casing member 5. Casing member 26 has flange 28 snugly fitting on the seat 19 and radially inwardly extending portion 29 therefrom snugly engaging the seat 20. In practice, these casing members 5 and 26 are desirably of zinc or other die-cast elements of snug fitting relation. As thus assembled, there is provided an inwardly open channel seat 30 of U-shape in cross section by this seat 22, ledge 21 and the inwardly extending section of the portion 29. Centrally, this casing member 26 is provided with closure 31 concentric with the projector 16.

Diaphragm 32, say of thin sheet steel as tempered Swedish spring steel, has peripheral notches 33 for clearance of the bolts 23. Inasmuch as these bolts 23 are overlapping in their extent from the seat 20 to the seat 22, that is partially across the ledge 21, these notches serve to anchor the disk or diaphragm 32 against rotation relatively to the casing. There is such normal clearance not only at these notches 33 but in peripheral region 34 that there may be some expansion and contraction as well as eccentric shifting of the diaphragm 32 in its snug slip fit in the seat 30.

However, this seat 30, in practice, is one not designed to accommodate other than radial shifting as to the diaphragm 32. This means that there is not appreciable axial shifting at the periphery. This thin Swedish sheet steel flexible disk 32 has central opening 35, through which extends sleeve 36 having terminal shoulder 37. The sleeve 36 as herein adopted, has rigid washers 38, 39, adjacent the shoulder 37. The washer 39 is spaced from direct contact with the sheet metal diaphragm 32 by washer 40, desirably of a fiber base as paper or linen impregnated say with phenol condensation product. This results in a tough, slightly compressible washer, locating in its periphery flex region 41 on such side of the diaphragm 32. Different diameter, similar stock, compressible washer 42 is located on the opposite side of the diaphragm 32, and as held by washer 43 and nut 44, locates a flex region 45 on the opposite side from the flex region 41 and spaced therefrom, in this instance concentrically inward. There is, accordingly, minimizing of chances for shear and a lengthening of the life of the diaphragm.

In this internally threaded sleeve 36, there is located externally threaded bolt 46, having thereon lock nut 47. This bolt 46 protrudes beyond the shoulder 37 and there has spun or riveted head 48 spaced by compressible washer 49 from minor valve disk 50. The minor valve disk 50 on the opposite side has compressible washer 51 held spaced from larger diameter portion or shoulder by metal washer 52. The washers 40, 42, 49, 51, are of similar compressible material. The minor secondary disk 50 is located to cooperate with the seat 17. The adjustment for such predetermined cooperation is through this bolt 46 mounting the minor disk to be positioned by the major diaphragm 32.

The axial adjustment between the disks is determined by releasing lock nut 47, and with a tool such as a screw driver, acting on notch 53 for rotating to increase or decrease the distance between these two disks 32 and 50. There may be occasion to position this minor disk 50 for normal nicety of clearance as to the seat 17 in determining tonal response. To this end, ready access to chamber 54 is had by removal of closure bolt 31. As this adjustment is determined, the lock nut 47 is re-set and the closure plug or short bolt 31 is re-positioned to close this chamber 54.

In operation in the instance herein described with sub-atmospheric pressure, the disk 50 which, as a valve, normally approaches closure position at the seat 17, vibrates as to such seat due to the reduction of air pressure in the chamber 14, with the resultant flexing of the larger diaphragm 32 toward the projector 16 because of the greater area of this diaphragm 32 in the reduced pressure chamber 14. The opposite side of the diaphragm 32 is in chamber 54 normally at atmospheric pressure, but the air therein is trapped so that there is effective dampening of the action of this sound signaling device in the vibratory response effected from the flexible disk 32 as acting upon the minor flexible disk or valve 50.

Each of these disks is desirably of thin sheet steel and subjected to slight flexing. The bolt 46 is connecting means spacing the disks 50, 32, from each other approximately the distance between the planes of the seats 17, 30. The compressed washers dissipate strain and stress from fatigue. Furthermore, they avoid erosion attack or weakening for such attack in the central regions of flexure. There is also avoidance of shock to the diaphragms due to the reversals of the oscillating system comprising the minor or valve disk 50 and the major or actuator disk 32.

In the operations hereunder, there is air column disturbance and frequency to give a good, clear air tone which has a range of regulation for penetration and carrying powers. Furthermore, this pneumatic response, even though suction, is uniformly effective under ranges of temperature affecting the contraction and expansion of the disks for such do not produce any buckle in either disk due to their location for peripheral clearance. Furthermore, the power disk 32 has such snug seating in the seat 30 that, while there is accommodation against binding or disk distortion allowing the disk to center itself or to shift itself as to its center, there is effective packing of the chamber 14 as exposed to the reduced pressure against such exhausting the chamber 54. This effective packing follows herein due to the effective seating and holding of the edges of the disk 32.

The air trapped in the chamber 54 by the diaphragm 32 is an effective dampening factor. Untoward balance of air therein may seep through the seat 30 at non-operating conditions of this signal. However, during operation, the diaphragm 32 is peripherally effectively sealed at its self-centered floating position. In practice, a desirable thickness gage for this diaphragm 32, when of tempered Swedish spring steel, may be of .010". This thickness of the diaphragm is a factor in determining the tone or pitch. Additionally, there is a factor in the length of the air column as in the projector 16 as well as the total weight of the moving mass as including the valve disk 50 and the parts therefrom mounted on the threaded member or bolt 46 and shiftable. Inasmuch as this thickness of the diaphragm 32, length of the air column in the projector 16, and the total weight of these moving masses as oscillated in operation are to a degree fixed in the completed structure, there is an effective factor for tone adjustment in varying the distance between the valve 50 and the diaphragm 32.

In practice, this disk 50 seemingly is actually in a sealing position on the seat 17 for a nicety and clarity for tone adjustment.

What is claimed and it is desired to secure by Letters Patent is:

1. A sound producing signal comprising a casing providing a seat of ring form in a common plane and of inwardly open U-cross section, a centrally oscillatable diaphragm having its peripheral edges held in said seat against oscillation in signal operation, said seat and diaphragm providing a seal at said seat and chambers in the casing, said chambers being spaced from communication therebetween by said diaphragm in signal operation, said diaphragm being normally of less diameter than the ring diameter from the depth of the seat and with slip-fit coaction therewith at non-operation of the signal, a projector from the casing of the signal having communication therewith from the chamber controlled by said diaphragm, and signal actuating pneumatic means connected to said chamber for bringing said diaphragm to sealing position in said seat upon operation of the signal.

2. A sound producing signal casing providing an inwardly open channel ring forming a seat, an eccentrically shiftable centrally oscillatable diaphragm having its peripheral edges at said seat, said casing and diaphragm having a seal at said seat during signal operation providing two chambers spaced from communication therebetween by said diaphragm, said diaphragm being normally of less diameter than the ring diameter from the depth of the channel seat to permit eccentric shifting of the diaphragm at non-operation of said signal, and a projector from the casing, said diaphragm upon operation of the signal, controlling communication between one of said chambers and the projector with said diaphragm in sealing position at said seat.

3. A sound producing signal comprising a casing providing a seat of ring form in a common plane and of inwardly open U-cross section, and a centrally oscillatable diaphragm having its peripheral edges held in said seat against oscillation in signal operation, said seat and diaphragm providing a seal at said seat and chambers in the casing, said chambers being spaced from communication therebetween by said diaphragm in signal operation, said diaphragm being normally of less diameter than the ring diameter from the depth of the seat and with slip-fit coaction therewith at non-operation of the signal, there being keying means between the casing and diaphragm holding said diaphragm against rotation relatively to the casing.

4. A sound producing signal casing comprising a pair of opposing interfitting members providing an inwardly open channel ring forming a seat, an eccentrically shiftable, centrally oscillatable diaphragm having at signal operation a peripheral seal at its edges in said seat, and normally with radial clearway of the diaphragm as to the seat, said diaphragm being peripherally notched, and casing-member-assembly bolts in said notches restraining the diaphragm against rotation relatively to the casing, with slip-fit coaction between the diaphragm and seat at non-operation of the signal.

5. A pneumatic sound producing signal casing providing a seat, a diaphragm having its edges pneumatically sealing with said seat in signal operation, said diaphragm having normally a radially-free periphery in said seat at non-operation of the signal, said diaphragm in signal operation forming with the seat and casing two chambers spaced from communication by said diaphragm, and a projector and signal actuating pneumatic means each adapted to have communication with one of said chambers and said means bringing said diaphragm to sealing position in said seat.

6. A pneumatic sound producing signal casing providing a chamber having a pair of independent axially-spaced, annularly-continuous seats each in a different plane, a pair of flexible disks one for each seat and normally in the plane of such seat, one of said disks and seats cooperating to provide a pneumatic seal for said chamber with said disk forming a closure side for the chamber as a complete partition, and rigid connecting means between and centrally spacing the disks approximately the distance between the planes of said seats, said seats cooperating to limit longitudinal movement of said connecting means in operation to the range of central portion oscillation of said disks, said casing in the peripheral planes of said disks being of greater diameter than said disks to permit limited eccentric shifting of the disks and connecting means relatively to said casing.

7. A sound apparatus sheet metal diaphragm having a central opening therethrough, a relatively compressible washer about said opening on one side of said diaphragm, a different diameter, relatively compressible washer about the opening on the other side of said diaphragm, and rigid means clamping said washers, thereby determining dissimilar flexing regions upon opposite sides of said diaphragm.

8. A sound producing signal casing comprising a pair of opposing interfitting members providing an inwardly-open U-shaped cross section ring forming a seat, an eccentrically shiftable diaphragm peripherally in said seat, said diaphragm being peripherally notched, and casing-member-assembling bolts in said notches restraining the diaphragm against rotation relatively to the casing, said diaphragm being held at said seat against clatter in the sound operation of said signal.

FREDERICK VON VOIGTLANDER.